US009830466B2

(12) United States Patent
Ikegami et al.

(10) Patent No.: US 9,830,466 B2
(45) Date of Patent: Nov. 28, 2017

(54) INFORMATION INPUT AND OUTPUT APPARATUS

(71) Applicant: TOSHIBA TEC KABUSHIKI KAISHA, Shinagawa-ku, Tokyo (JP)

(72) Inventors: Fumihiko Ikegami, Kanagawa (JP); Takafumi Fukushima, Shizuoka (JP); Yuuichi Koba, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 426 days.

(21) Appl. No.: 14/541,423

(22) Filed: Nov. 14, 2014

(65) Prior Publication Data

US 2015/0143541 A1    May 21, 2015

(30) Foreign Application Priority Data

Nov. 19, 2013 (JP) ................................. 2013-238870

(51) Int. Cl.
*G06F 21/62* (2013.01)
*G06F 21/83* (2013.01)

(52) U.S. Cl.
CPC .......... *G06F 21/6218* (2013.01); *G06F 21/83* (2013.01)

(58) Field of Classification Search
CPC .... G09F 3/0288; G06F 31/6218; G06F 21/45; G06F 21/70; G06F 21/83; H04L 63/08
See application file for complete search history.

(56) References Cited

U.S. PATENT DOCUMENTS

| 9,354,807 | B2 * | 5/2016 | Deluca ................. G06F 3/0488 |
| 2002/0108039 | A1 | 8/2002 | Kubo et al. |
| 2005/0078221 | A1 * | 4/2005 | Kobayashi ............. H04N 5/278 348/600 |
| 2011/0193806 | A1 * | 8/2011 | Kim ...................... G06F 1/1615 345/173 |
| 2013/0185674 | A1 * | 7/2013 | Iwaki ................ G06F 17/30964 715/810 |

FOREIGN PATENT DOCUMENTS

JP    2013-012057    1/2013

* cited by examiner

*Primary Examiner* — Tadeese Hailu
(74) *Attorney, Agent, or Firm* — Amin, Turocy & Watson LLP

(57) ABSTRACT

There is provided an information input and output apparatus including a screen control unit that generates a screen which includes at least one region to input or output information, as a window, a display attribute storage unit that stores a display and a non-display of each of the windows on the screen, and a position and a size of each of the windows when the windows are displayed on the screen, as a display attribute for each window, a display unit that displays the screen generated by the screen control unit, and a contact position detecting unit that is disposed along a display surface of the display unit, and outputs a coordinate for each contact position to the screen control unit when contacts are simultaneously detected at a plurality of positions. The screen control unit determines a region that is formed by connecting a plurality of contact positions, on the basis of coordinate information of the plurality of contact positions acquired by the contact position detecting unit, and changes the display attribute of the window in accordance with the region.

4 Claims, 9 Drawing Sheets

FIG. 2

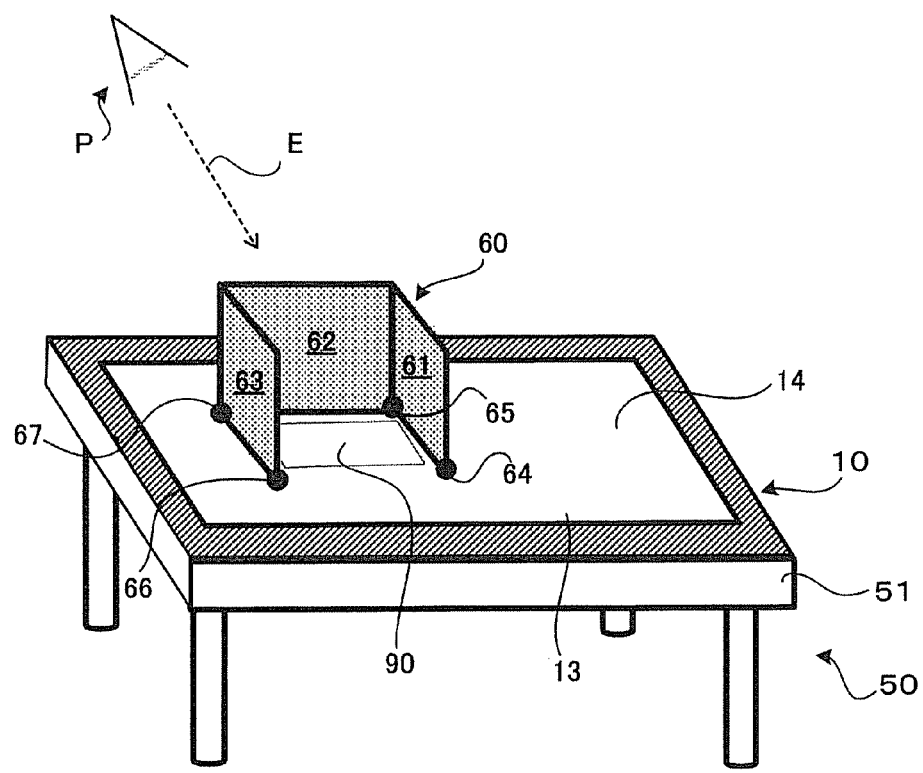

FIG. 3

| TYPES OF APPLICATIONS | TYPES OF WINDOWS | DISPLAY POSITION OF WINDOW | | DISPLAY STATE | SECURITY ATTRIBUTE |
|---|---|---|---|---|---|
| | | COORDINATE OF UPPER LEFT CORNER | COORDINATE OF LOWER RIGHT CORNER | | |
| BUSINESS TALK APP | CATALOG WINDOW | (X11,Y11) | (X12,Y12) | ON DISPLAY | OPEN |
| | PURCHASE WINDOW | (X21,Y21) | (X22,Y22) | ON DISPLAY | OPEN |
| | PERSONAL IDENTIFICATION NUMBER INPUT WINDOW | (X31,Y31) | (X32,Y32) | NOT YET DISPLAYED | SECRET |
| ADVERTISEMENT APP | ADVERTISEMENT WINDOW | (X41,Y41) | (X42,Y42) | ON DISPLAY | OPEN |

(FIG. 1)
FIRST CASE (FIG. 2)
SECOND CASE

INFORMATION INPUT AND OUTPUT APPARATUS

CROSS-REFERENCE TO RELATED APPLICATION

This application is based upon and claims the benefit of priority from Japanese Patent Application No. 2013-238870, filed Nov. 19, 2013, the entire contents of which are incorporated herein by reference.

FIELD

Embodiments described herein relate generally to a peep-proof technology against another person's sight, when a display unit (display) that displays an image is operated while viewed.

BACKGROUND

In the related art, an information terminal that includes a touch panel on a display surface of a display is widely used. A large-sized information terminal, such as 27-inch one or 32-inch one, is disposed horizontally on a top surface of a table or the like, and thus, there are merits that anyone out of many people around the table easily sees and operates a display. These merits enable the information terminal to be utilized for a business meeting, a business talk at a store, or education at school or at a museum.

Incidentally, in the information terminal, in general, secret information, such as a password or a personal identification number, is input to perform a user's authentication, and after the authentication pass, information that the user is only allowed to browse is output.

However, as a side effect of the merits of easily seeing the display surface, the information terminal with a large-sized external appearance has security problems in that a third person who has nothing to do with the information easily peeps the information, during operation.

Regarding the problems, examples of secret information inputs using a touch panel are the following technologies in the related art.

Technologies disclosed in JP-A-11-149454, JP-A-2004-70941, and JP-A-2008-226243 use a member, on which a plurality of discontinuous bottomed bores or through-holes, or notches or marks is provided, as an authentication key.

A user makes the authentication key member come into contact with a touch panel to input a coordinate of a bore on the authentication key member, and an information terminal compares the input coordinate with a pre-registered coordinate to perform authentication.

A technology disclosed in JP-A-2013-12057 uses a member of which 4×4, total 16 bores are opened on the front surface as an authentication key. A plurality of conductive pins is inserted into any bores out of the 16 bores, and when a user makes the front surface of the key come into contact with a touch panel, each pin is detected by the touch panel. Authentication is performed by checking that an insertion pattern of pins into the bores out of the 16 bores matches a pre-registered pattern.

When these technologies are used, without a risk of a peep by a third person, the secret information for the authentication can be safely input to the information terminal.

In addition, regarding an output of information from a display, a film that, when adhered to a display, causes visibility from any direction except for a specific direction to be remarkably decreased, that is, a so-called "peep-proof film", is widely used. When the film is adhered, the information displayed on the display can be prevented from a peep by a third person.

DESCRIPTION OF THE DRAWINGS

FIG. 2 is a schematic perspective view illustrating a physical embodiment of the information terminal in FIG. 1.

FIG. 3 is a diagram illustrating an example of a display attribute table that is stored in a display attribute storage unit in FIG. 1.

DETAILED DESCRIPTION

However, the technologies disclosed in JP-A-11-149454, JP-A-2004-70941, JP-A-2008-226243, and JP-A-2013-12057 have a problem in that the cost is high, because an authentication key has to be issued for each user in advance.

In addition, since the secret information that can be input to an information terminal from the key is set in advance, there is a problem in that it is not possible to input other information. For example, in a business talk at a store, a customer inputs privacy information, such as a surname or an address, for delivery of goods in some cases. However, in the technologies disclosed in JP-A-11-149454, JP-A-2004-70941, JP-A-2008-226243, and JP-A-2013-12057, it is not possible to secretly input information that is not pre-registered.

In addition, since the "peep-proof film" causes low visible recognition to be consistently decreased regardless of whether or not the output information is secret, there is a problem in that the merits of the large-sized information terminal of which anyone easily views display content greatly deteriorate.

An advantage of an exemplary embodiment is to prevent a third person from inadvertently peeping at a region to input or output secret information in an information input and output apparatus that includes a display unit (display) that displays an image, and a contact position detecting unit (touch panel) that detects a contact of an object onto a display surface thereof.

An information input and output apparatus to solve the above problems is configured to include a screen control unit that generates a screen which includes at least one region to input or output information, as a window, a display attribute storage unit that stores a display and a non-display of each of the windows on a screen, and a position and a size of each of the windows when the windows are displayed on a screen, as a display attribute for each window, a display unit that displays the screen generated by the screen control unit, and a contact position detecting unit that is disposed along a display surface of the display unit, and outputs a coordinate for each contact position to the screen control unit when contacts are simultaneously detected at a plurality of positions. The screen control unit determines a region that is formed by connecting a plurality of contact positions, on the basis of coordinate information of the plurality of contact positions acquired by the contact position detecting unit, and changes the display attribute of the window in accordance with the region.

Hereinafter, exemplary embodiments are described with reference to the drawings.

First Embodiment

Figure 1:
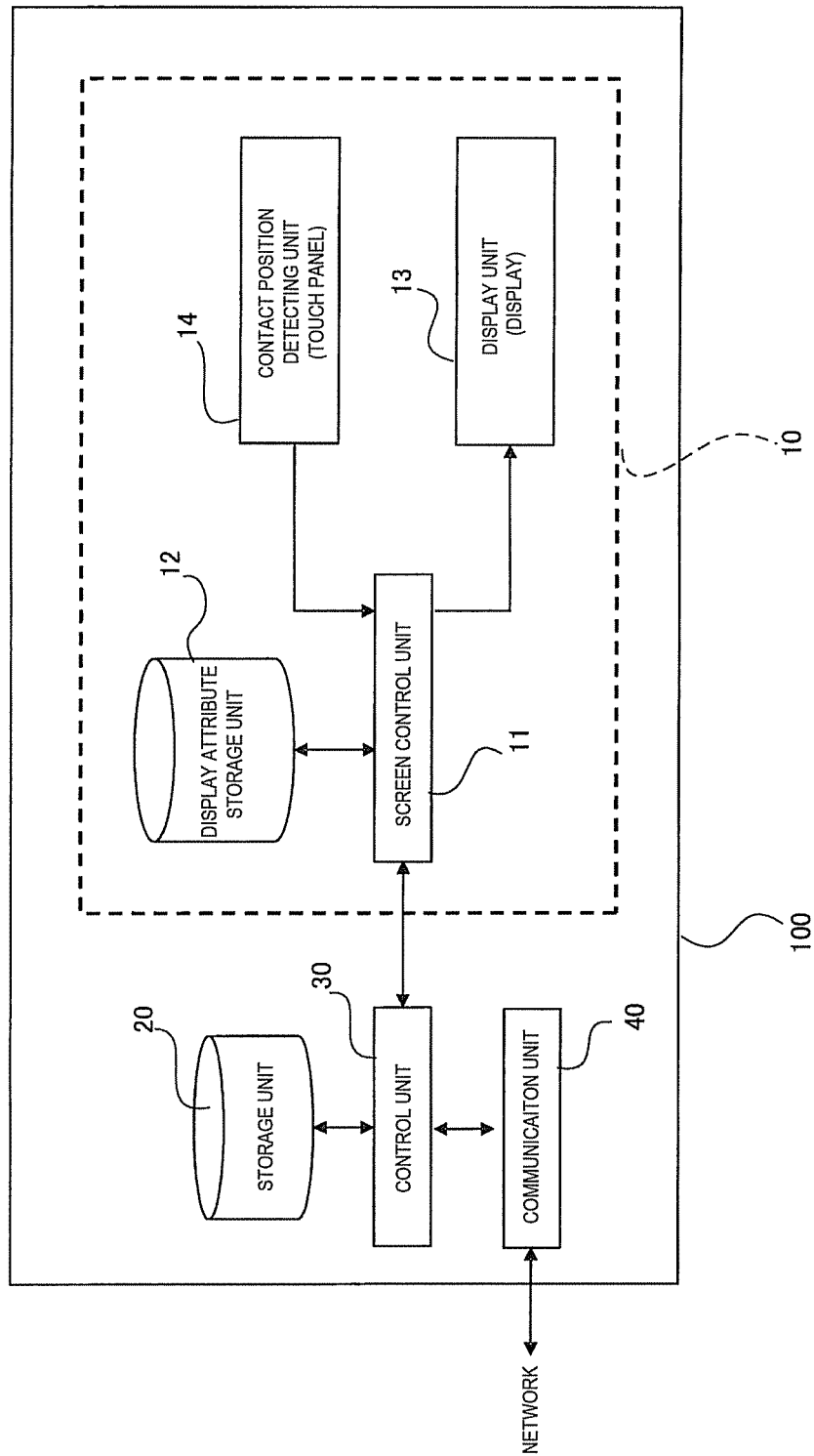
FIG. 1 is a block diagram illustrating a configuration of an information terminal into which an information input and output apparatus is incorporated.

FIG. 1 is a diagram illustrating a configuration of an information terminal into which an information input and output apparatus according to the present embodiment is incorporated.

In FIG. 1, an information input and output apparatus 10 is shown in a range surrounded by a frame of a dotted line. The information input and output apparatus 10 is configured to include a screen control unit 11 that generates a screen which includes at least one window, a display attribute storage unit 12 that stores a display position and a display size of each of the windows and the like as a display attribute table, a display unit 13 that displays the screen generated by the screen control unit 11, and a contact position detecting unit 14 that is disposed along a display surface of the display unit 13, and detects a contact position of an object. Specifically, the display unit 13 is, for example, a liquid crystal display, and the contact position detecting unit 14 is, for example, an electrostatic capacitance type touch panel that is provided with a multi-touch function, but both are not limited thereto.

In FIG. 1, an information terminal 100 is shown in a range surrounded by a frame of a solid line. The information terminal 100 is configured to include the information input and output apparatus 10 according to the present embodiment, a storage unit 20, a control unit 30, and a communication unit 40. The storage unit 20 stores a program of various applications, such as a business meeting application or a goods sale application and data that is processed by the program. The control unit 30 issues instructions to execute an application and to perform a window display to the screen control unit 11. The communication unit 40 performs communication with an external server or the like, via, for example, a network, in accordance with the instructions of the application.

FIG. 2 is a view illustrating a physical example of the information terminal in FIG. 1. In FIG. 2, the information input and output apparatus 10 according to the present embodiment is fixedly disposed on a top plate 51 of a table 50, on which a peep-blocking cover (hereinafter, called cover) 60 is mounted for blocking a window from a line of sight E of a third person P. Secret information, such as a personal identification number or a password, is input on the window. The cover is not fixed to the information terminal 100, but can be placed at any position on a touch panel 14, as necessary, or removed.

As illustrated in FIG. 2, the cover 60 is configured to connect a left plate member 63 and a right plate member 61 which are erected on both right and left sides of an erected plate member 62 at the center, and is formed as a three-wall structure that is opened on the front side, on the top, and on the bottom. According to the present embodiment, the right and left plate members 61 and 63 are connected to the center plate member 62 at an angle of 90°, but are not limited thereto. The attachment angle of the right and left plate members 61 and 63 may be greater or less than 90° in a range in which a peep is not possible.

In addition, contact leg portions 64 to 67 are provided at four places at lower ends of the cover 60. When the cover 60 is mounted on the touch panel 14, these contact leg portions 64 to 67 simultaneously come into contact with the touch panel 14.

FIG. 3 illustrates an example of a display attribute table that is stored by the display attribute storage unit 12. The display attribute table illustrated in FIG. 3 shows operations of two applications, a business talk app and an advertisement app, in the control unit 30 of the information terminal 100 illustrated in FIG. 1.

Figure 4:
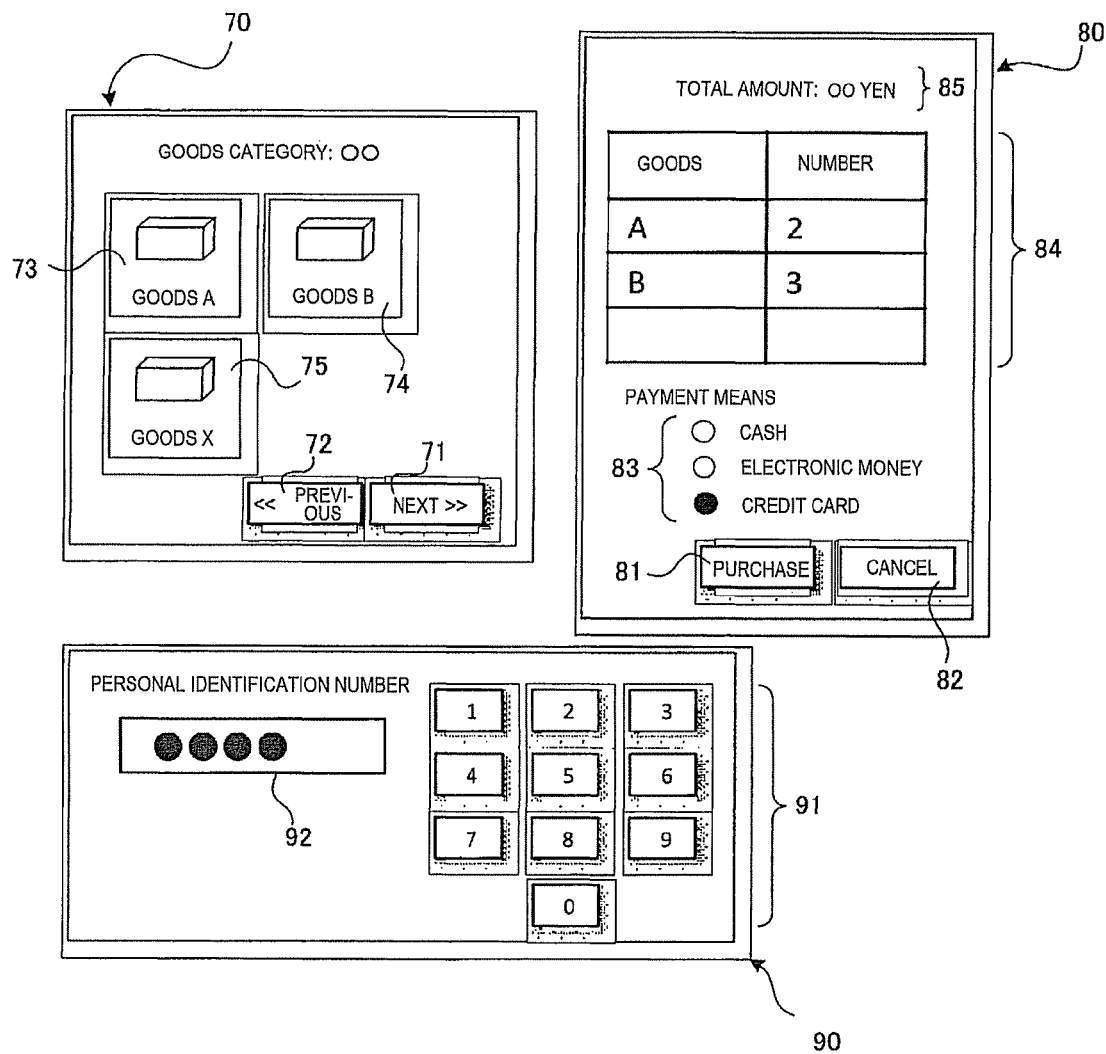
FIG. 4 is a diagram illustrating a display example of a window on a display according to a first embodiment.

The business talk app has three windows, a catalog window 70, a purchase window 80, and a personal identification number input window 90, with reference to FIG. 4. In addition, the advertisement app has one advertisement window. Each of those windows has a security attribute that indicates whether or not information that is input or output is secret, in addition to coordinates of an upper left corner and a lower right corner which specify a display position and a display size on the display 13.

In an example illustrated in FIG. 3, the personal identification number input window 90 is for performing input of a personal identification number of a credit card or the like, which can result in a problem when a third person peeps at the number. Therefore, the personal identification number input window 90 is set to be "secret" for the security attribute, but other windows do not need to be secret, and thus the security attribute are set to be "open" for the other windows.

FIG. 4 illustrates a display example of each of the catalog window 70, the purchase window 80, and the personal identification number input window 90 on the display unit 13. On the catalog window 70, a next screen selecting display portion 71 that causes a next screen to be displayed, a previous screen selecting display portion 72 that causes a previous screen to be displayed, an icon 73 of goods A, an icon 74 of goods B, and an icon 75 of goods X that are displayed on the current screen are displayed.

On the purchase window 80, a "purchase" button 81, a "cancel" button 82, a "payment means" selecting portion 83 that performs a selection of payment means, a purchase list display portion 84 that displays a purchase list, and a total amount display portion 85 that displays a total amount of purchased goods are displayed.

On the personal identification number input window 90, a numerical keypad portion 91 and a personal identification number output portion 92 are displayed.

Figure 5:
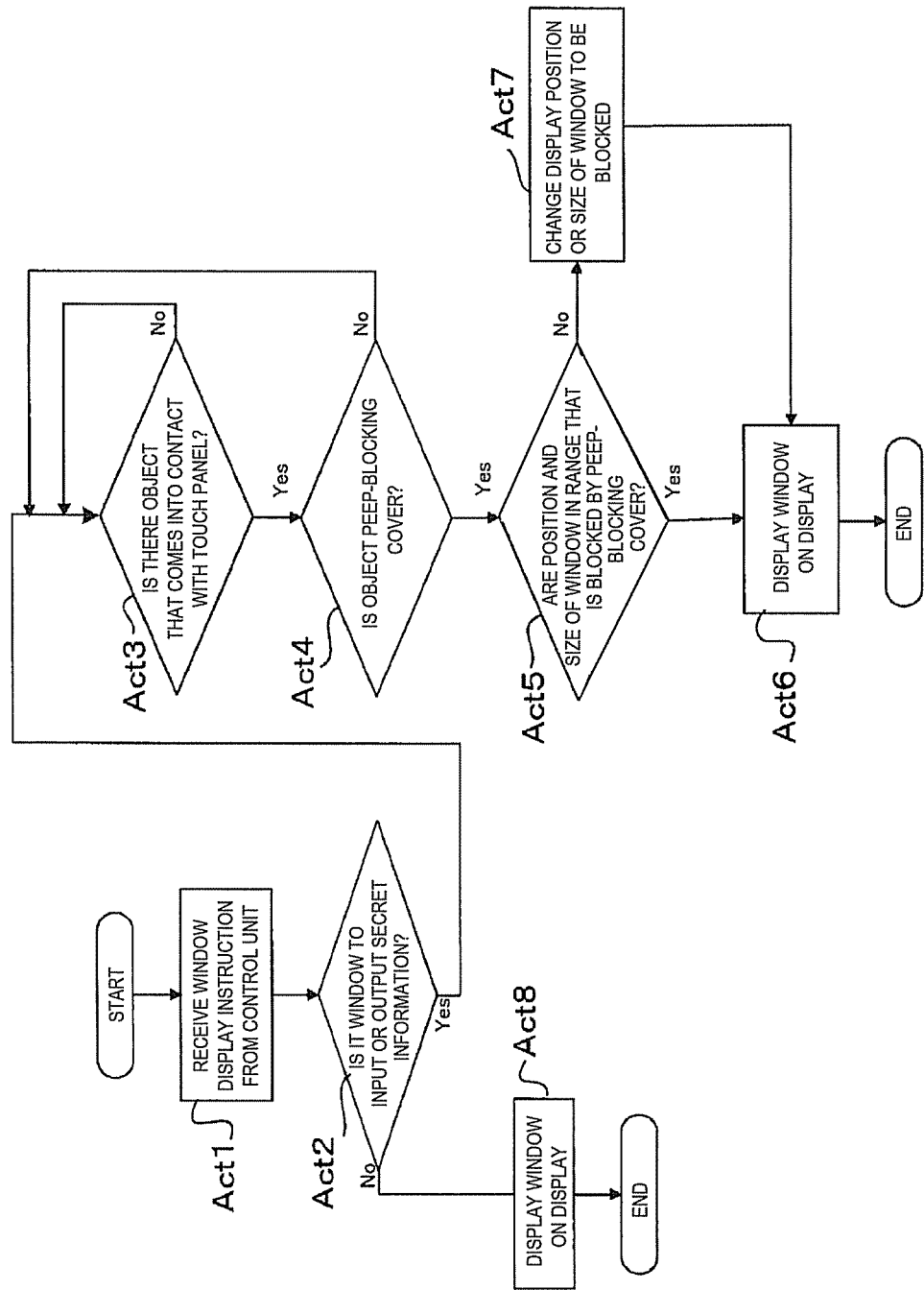
FIG. 5 is a flowchart illustrating a process of a screen control unit according to the first embodiment.

FIG. 5 is a flowchart illustrating a method of displaying a window for the information input or output in the information input and output apparatus 10 according to the present embodiment.

Hereinafter, an example of a flow of a specific process in the information terminal 100 is described as a business talk at a store. The business talk is performed in a following procedure. The business talk app is only related to the present process, out of the applications illustrated in FIG. 3.

First, a salesperson instructs the control unit 30 to start up the business talk application (hereinafter referred to as a business talk app).

When the screen control unit 11 of the information input and output apparatus 10 receives a window display instruction from the control unit 30 in Act 1, the screen control unit determines whether or not the window is the window to input or output the secret information in Act 2. Then, when the window is the window to input or output the secret information, the process proceeds to Act 3. Otherwise, the process proceeds to Act 8, and the screen control unit displays the window on the display unit 13. In Act 2, it is determined whether or not the window is the window to input or output the secret information, on the basis of a type of window instructed from the control unit 30.

That is, when the business talk app starts up, the business talk app instructs the screen control unit 11 to display, regarded as the security attribute to be "open" (unnecessary to block), the catalog window 70 that displays an image and a price of respective goods and for the purchase window 80 that displays a goods list selected by a customer and a total amount. At this time, display positions are also designated.

Here, the screen control unit 11 causes the display attribute storage unit 12 to store the display positions or the security attributes of the catalog window 70 and the purchase window 80 and further causes the display unit 13 to display them.

A customer touches any icons 73 to 75 of goods that the customer desires to purchase, out of goods displayed on the catalog window 70.

Whenever the screen control unit 11 detects pressure on the icons 73 to 75, the screen control unit notifies the business talk app of the control unit 30 of the detected result.

The business talk app updates a goods list and a total amount of the purchase window 80.

When the customer finishes selection of all desired goods, the customer presses the "purchase" button 81 of the purchase window 80.

The screen control unit 11 detects pressure on the "purchase" button 81, and notifies the business talk app of the control unit 30 of the detected result.

Then, when the screen control unit 11 determines that the display of the window to input or output the secret information is instructed in Act 2, the screen control unit determines whether or not there is an object that comes into contact with the touch panel 14 in Act 3. When there is an object that comes into contact with the touch panel, the process proceeds to Act 4. It is determined whether or not the contact object is the peep-blocking cover 60 in Act 4. When the contact object is determined to be the peep-blocking cover 60, the process proceeds to Act 5. Otherwise, the process returns to Act 3.

when the business talk app instructs the screen control unit 11 to perform a display, regarded as the security attribute to be "secret", the personal identification number input window 90 to input a personal identification number of a credit card, the process proceeds to Act 5.

In Acts 3 and 4, the screen control unit 11 causes the display attribute storage unit 12 to store a display position or a security attribute of the personal identification number input window 90. However, since the security attribute is "secret", the display of the personal identification number input window 90 is not performed until the cover 60 is detected to be placed.

The salesperson mounts the cover 60 for peep-blocking on the touch panel 14 on the table 50.

When the placement of the cover 60 is detected, the screen control unit 11 displays the personal identification number input window in a range which is blocked by the cover 60. The salesperson requests the customer to input the personal identification number of a credit card on the personal identification number input window.

Hereinafter, detection of the placement of the cover 60 for peep-blocking and the display of the secret information input and output window (in the above-described example, personal identification number input window) 90 will be described.

When the cover 60 for peep-blocking is mounted on the table 50, only the contact leg portions 64 to 67 provided on the four corners of the lower ends of the cover are held to come into contact with the touch panel 14. At this time, the contact positions (coordinates) of the respective contact leg portions 64 to 67 are simultaneously detected. The respective detected contact positions of the contact leg portions 64 to 67 are output to the screen control unit 11 as coordinate positions.

The screen control unit 11 determines that the cover is mounted on the touch panel, when the following conditions are all satisfied.

(1) when the four contact positions are simultaneously detected, (2) when the four points are connected and forma rectangle, and (3) all four points are continuously detected for a preset time or longer.

In addition, when the peep-blocking cover 60 is mounted on the touch panel 14, a region that displays the secret information input window can be obtained, for example, as follows (see FIGS. 9 to 12).

On the touch panel 14, the four points (corresponding to the contact leg portions of the peep-blocking cover) continuously detected for the preset time or longer line up in the order from a smaller or equal x coordinate, and, for example, are set to be vertexes 1 to 4. Since it is not clear which contact leg portion of the peep-blocking cover 60 corresponds to any vertex as is, the following process is performed. The process is referred to as "vertex determining process".

First, a y-coordinate of the vertex 2 is compared with a y-coordinate of the vertex 1. Any one process from the following is performed in accordance with the comparison result.

Figure 9:
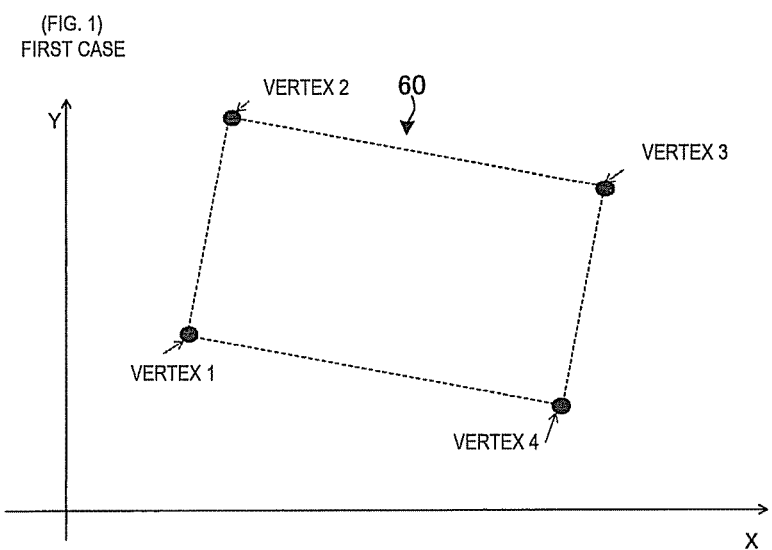
FIG. 9 is a diagram illustrating a generation method of a region to display a secret information input window.

First Case (See FIG. 9)

In FIG. 9, when the y-coordinate of the vertex 2 is greater than the y-coordinate of the vertex 1, the vertexes 3 and 4 are switched such that one vertex with a greater y-coordinate between the vertexes 3 and 4 is set to be the vertex 3, and the other vertex with less y-coordinate is set to be the vertex 4.

Figure 10:
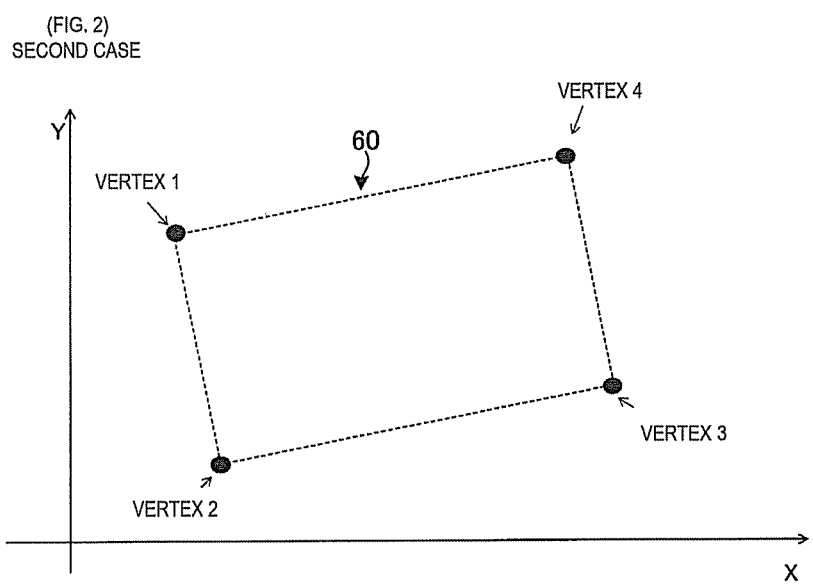
FIG. 10 is a diagram illustrating another generation method of a region to display a secret information input window.

Second Case (See FIG. 10)

When the y-coordinate of the vertex 2 is less than the y-coordinate of the vertex 1, the vertexes 3 and 4 are switched such that one vertex with a less y-coordinate between the vertexes 3 and 4 is set to be the vertex 3, and the other vertex with greater y-coordinate is set to be the vertex 4.

Further, the following examinations are performed to check that a rectangle is formed.

(1) A length of a line connecting the vertexes 1 and 2, and a length of a line connecting the vertexes 3 and 4 are obtained, and it is checked whether the two lengths are equal to each other.

(2) A length of a line connecting the vertexes 1 and 4, and a length of a line connecting the vertexes 2 and 3 are obtained, and it is checked whether the two lengths are equal to each other.

(3) It is checked whether an angle formed between a line connecting the vertexes 1 and 2, and a line connecting the vertexes 1 and 4 is a right angle.

When the above examinations are satisfied, the vertexes 1 to 4 are connected in this order, and finally the vertex 4 and the vertex 1 are connected to each other and a region is formed to be a rectangle. The region indicates a region to display the secret information input window.

Correlations between the contact leg portions of the peep-blocking cover 60 and the vertexes 1 to 4 are as follows.

In the first case, the vertex 1 corresponds to the contact leg portion 66 on the front left side, and the vertex 4 corresponds to the contact leg portion 64 on the front right side, as illustrated in FIG. 9. In the second case, the vertex 2 corresponds to the contact leg portion 66 on the front left side, and the vertex 3 corresponds to the contact leg portion 64 on the front right side, as illustrated in FIG. 10. Here, a small y coordinate indicates the front.

Even when the peep-blocking cover 60 is not placed to be exactly parallel to the sides of the display 13, it is considered that a user performs operation easily when the secret information input window 90 is caused to be displayed exactly in parallel to the sides of the display. An example of a display region setting process for the secret information input window is as follows. In the following description, the coordinates of the vertexes 1 to 4 of the peep-blocking cover 60 are set as (X1, Y1), (X2, Y2), (X3, Y3), (X4, Y4), respectively (see FIGS. 11 and 12).

A Case of the First Case in the "Vertex Determining Process"

Figure 11:
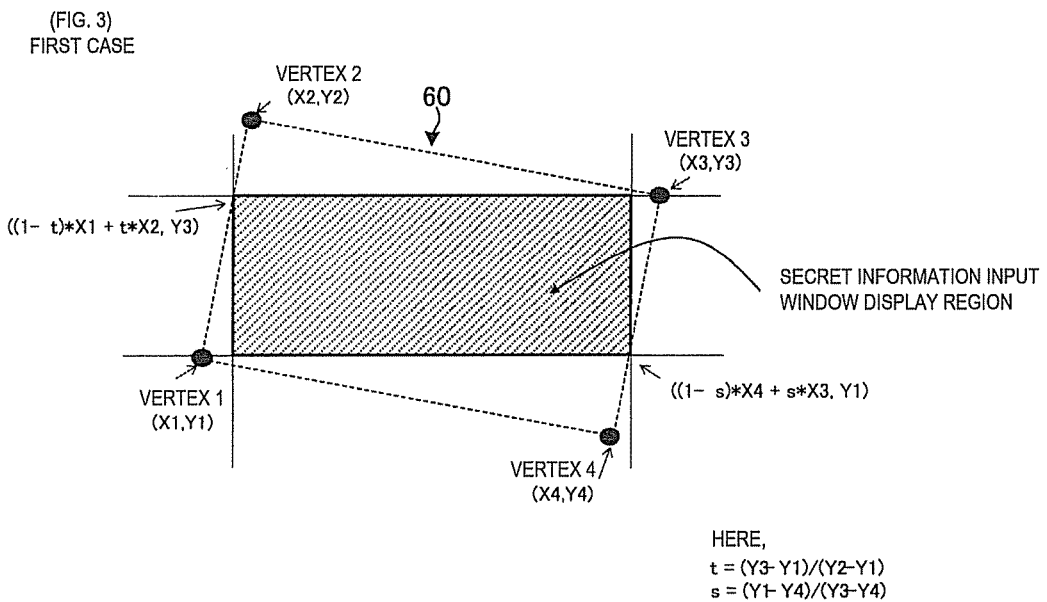
FIG. 11 a diagram illustrating still another generation method of a region to display a secret information input window.

In the case, the rectangle (that is, a region blocked by the peep-blocking cover 60) is inclined to be low in the right, as illustrated in FIG. 11. At this time, the display region of the secret information input window is set to be a rectangle (hatched region in FIG. 11) which is formed of a line extending to be parallel to the x axis that passes the vertex 3 of the peep-blocking cover 60, a point, at which the line intersects with a line connecting the vertexes 1 and 2, as an upper left corner, a line extending to be parallel to the x axis that passes the vertex 1 of the peep-blocking cover 60, and a point, at which the line intersects with a line connecting the vertexes 3 and 4, as a lower right corner.

A coordinate of the upper left corner of the rectangle is ($\{(1-t)*X1+t*X2\}$, Y3), and a coordinate of the lower right corner is ($\{(1-s)*X4+s*X3\}$, Y1). Here, $t=(Y3-Y1)/(Y2-Y1)$, and $s=(Y1-Y4)/(Y3-Y4)$.

A Case of the Second Case in the "Vertex Determining Process"

Figure 12:
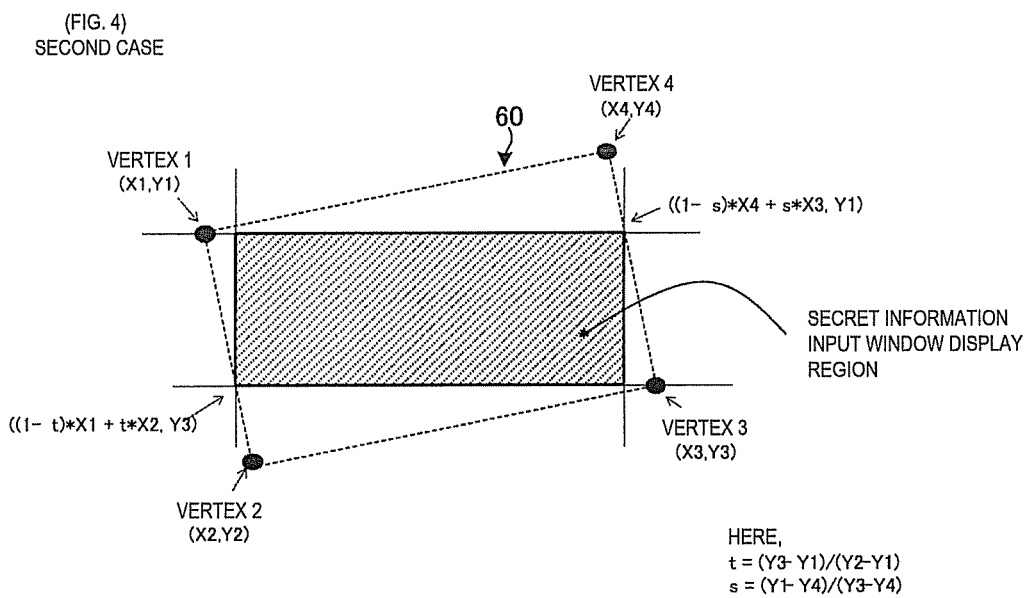
FIG. 12 a diagram illustrating still another generation method of a region to display a secret information input window.

In the case, the rectangle (that is, a region blocked by the peep-blocking cover 60) is inclined to be up in the right, as illustrated in FIG. 12. At this time, the display region of the secret information input window is set to be a rectangle which is formed of a line extending to be parallel to the x axis that passes the vertex 1 of the peep-blocking cover 60, a point, at which the line intersects with a line connecting the vertexes 3 and 4, as an upper right corner, a line extending to be parallel to the x axis that passes the vertex 3 of the peep-blocking cover 60, and a point, at which the line intersects with a line connecting the vertexes 1 and 2, as a lower left corner of the display region of the secret information input window. A coordinate of the upper right corner of the rectangle is ($\{(1-s)*X4+s*X3\}$, Y1), and a coordinate of the lower left corner is, ($\{(1-t)*X1+t*X2\}$, Y3). Here, $s=(Y1-Y4)/(Y3-Y4)$, and $t=(Y3-Y1)/(Y2-Y1)$.

The screen control unit 11 causes the personal identification number input window 90 that is the secret information input and output window not to be displayed on the screen, until the screen control unit determines that the cover 60 is mounted on the touch panel 14. At this time, in addition to a complete non-display on the screen, the personal identification number input window 90 may be present on the screen by means of iconification, minimization, or the like, in which it is not possible to read the display contents or to perform the input operation of information.

When the screen control unit 11 determines that the cover 60 is mounted, the screen control unit 11 displays the secret information input and output window on the display. At this time, the position and size of the window display (to be designated as the coordinates of the upper left corner and the lower right corner) are changed in accordance with a detected leg position of the cover. The positional relationship between the positions of the contact leg portions 64 to 67 of the cover 60 and the windows are illustrated in FIG. 6.

In Act 5, it is determined whether or not the position and size of the personal identification number input window 90 are in a range that is blocked by the peep-blocking cover 60. When the position and size are in the blocked range, the process proceeds to Act 6, but when not in the blocked range, proceeds to Act 7.

Accordingly, the operation of the personal identification number input window 90 is performed without a peep at the region surrounded by the cover 60.

Figure 6A:
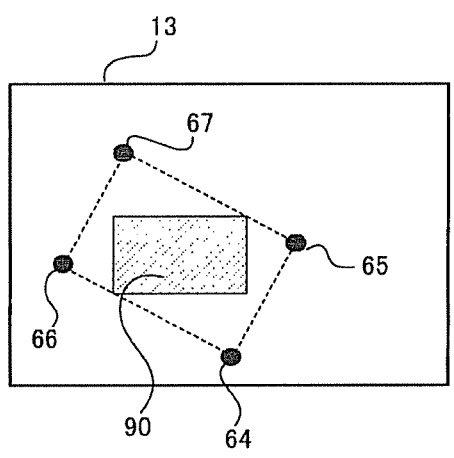
FIGS. 6A and 6B are views illustrating positional relationships between a peep-blocking cover and a secret information input and output window.
Figure 6B:
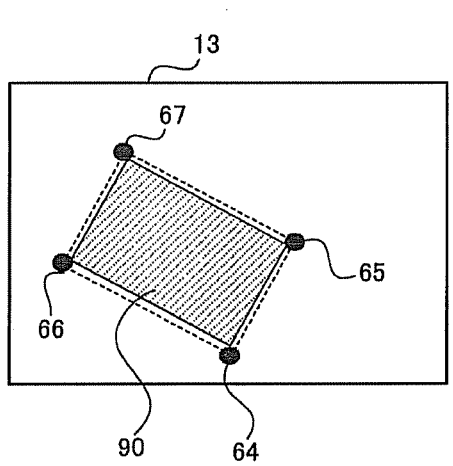

According to the present embodiment, the cover 60 can be mounted in any direction. The cover 60 may not be placed to be parallel to the lateral sides of the display unit 13 in FIG. 6. When the cover 60 is placed to be inclined to the lateral sides of the display unit 13, the window 90 is displayed such that the window 90 is parallel to the lateral sides of the display unit 13 as illustrated in FIG. 6A, or the window 90 is parallel to sides of the cover 60 as illustrated in FIG. 6B.

In addition, the size of the peep-blocking cover 60 is not limited to one size. For example, a cover with a standard size is used usually, but it is possible to use a large-sized cover for a customer, such as the elderly, who is expected to be difficult to read and write small characters. Since the window becomes wider in accordance with the size of the cover, there is a merit that, for example, a software keyboard included in the window or the input region by hand-writing becomes wider in proportion thereto, and the input is easily performed.

Second Embodiment

Figure 7:
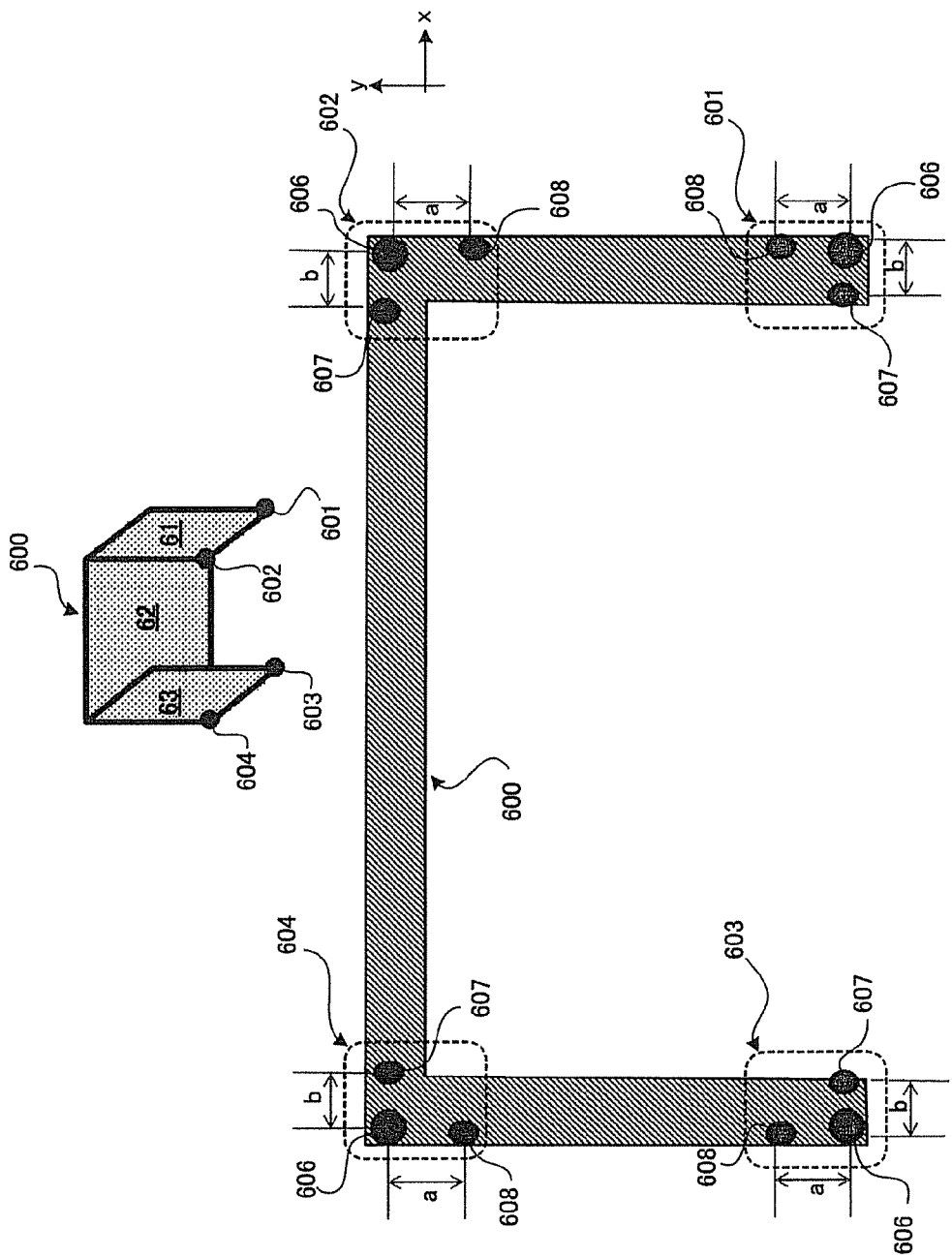
FIG. 7 is a view illustrating an example of a peep-blocking cover according to a second embodiment.

FIG. 7 is a view illustrating a peep-blocking cover 600 according to a second embodiment.

According to the first embodiment, the peep-blocking cover 60 has the contact leg portions 64 to 67 at four corners on the lower end of the cover. When the cover 60 is mounted on the touch panel 14 and the contact leg portions 64 to 67 are disposed on the touch panel 14, there is misdetection because the cover 60 is determined to be a cover for peep-blocking in any case.

According to the present embodiment, contact leg portions 601 to 604 of the cover 600 are configured to have a discernible contact pattern.

As illustrated in FIG. 7, the contact leg portions 601 to 604 are provided at the four corners of the cover 600. Those contact leg portions 601 to 604 are configured to have a plurality of contact legs 606 to 608 disposed within a predetermined region.

The first contact leg 606, the second contact leg 607, and the third contact leg 608 that configure each of the contact leg portions 601 to 604 are disposed such that in two axes (X axis and Y axis) that are orthogonal to each other with the first contact leg 606 as an intersection point, the second contact leg 607 is disposed to be separated from the first contact leg 606 by a distance b in the X axis direction, and the third contact leg 608 is disposed to be separated from the first contact leg 606 by a distance a (distance a is different from distance b) in the Y axis direction. In addition, in the first contact leg portion 601, the distance a is positioned at a plus coordinate, and the distance b is positioned at a minus coordinate. In the second contact leg portion 602, the distances a and b are both positioned at minus coordinates. In the third contact leg portion 603, the distances a and b are both positioned at plus coordinates. In the fourth contact leg portion 604, the distance a is positioned at a minus coordinate, and the distance b is positioned at a plus coordinate.

According to the embodiment, a contact pattern that is formed by the disposed positions of the first contact leg 606, the second contact leg 607, and the third contact leg 608 that configure each of the first contact leg portion 601, the second contact leg portion 602, the third contact leg portion 603, and the fourth contact leg portion 604 is stored (registered) in, for example, the storage unit 20 illustrated in FIG. 1 as an object contact pattern in advance.

In the above-described configuration of the contact leg portions 601 to 604, when the portions are rotated with any one contact leg portion as a center, the contact pattern does not match a contact pattern of any one of the other three contact leg portions. Therefore, it is possible to reliably detect that the detected contact leg portion is any one contact leg portion of the first contact leg portion 601 to fourth contact leg portion 604, or that the detected contact leg portion is not any contact leg portion. Accordingly, even when all of the four contact leg portions are not mounted on the touch panel 14 (that is, when some contact leg portions are present outside the place), it is possible to display the secret information input and output window at an exact position.

That is, when an object other than the cover 600 is mounted on the touch panel 14, the pre-registered object contact pattern is compared with the detection information detected by the touch panel, and it is determined that the object mounted on the touch panel 14 is not the cover 600. Therefore, it is possible to prevent occurrence of misoperation when an object other than the cover is mounted on the touch panel.

In addition, a range is registered, in which the line of sight E of the third person P is actually blocked as illustrated in FIG. 2 using the cover 600 in accordance with the disposed positions of the contact leg portions provided on the cover 600, and thus, it is possible to cause a window for secret information input or output to be displayed at a more accurate position and size.

Even when the touch panel 14 detects a leg that comes into contact therewith, it is determined that the cover 600 is not mounted when the pattern does not match any one of the registered object contact patterns, (that is, it is determined that it is not a state in which the secret information is safely input), and the input screen of the secret information is not displayed.

The simplest registering method of an object contact pattern is to register intervals between each of the four contact leg portions 64 to 67 of the cover 60 in FIG. 2. For example, when the contact leg portions of the cover 60 is connected, a rectangle with A cm of a short side and B cm of a long side is formed, and the values of A and B are registered. In the touch panel 14, when a four-point contact is detected, the screen control unit 11 examines whether the connection of the contact positions forms a rectangle, and the lengths of the sides are A cm and B cm. Only when the detected results match the registered information, the object is determined to be the cover 60.

Third Embodiment

Figure 8:
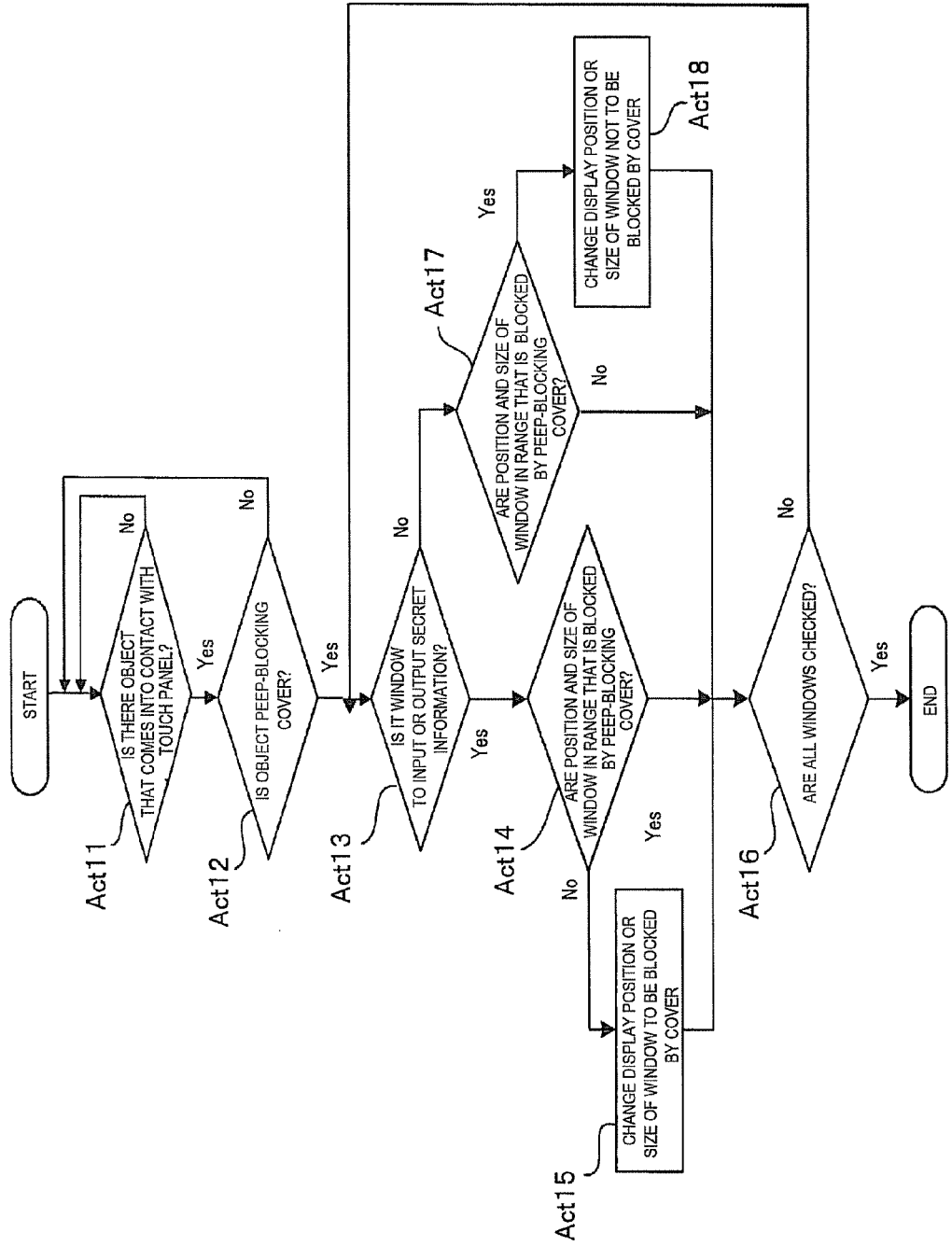
FIG. 8 is a flowchart illustrating a process of a screen control unit according to a third embodiment.

FIG. 8 is a flowchart illustrating a third embodiment.

According to the first embodiment, in the process described using the flowchart of FIG. 5, the window that is not necessary to be secret (window of which the security attribute is "open" in FIG. 3) is displayed at a position determined in advance regardless of whether or not the peep-blocking cover is mounted on the touch panel, and of where the position is when the cover is mounted.

However, in some cases, it is inconvenient that the peep-blocking cover blocks the window that is not necessary to be particularly secret. For example, in an example of a business talk according to the first embodiment, when the customer inputs a personal identification number, and can check whether the purchased goods are neither too much nor too little just to be sure, it is possible to prevent a purchase mistake, and it is considered that it is highly convenient for the customer. That is, it is desirable that the purchase window be displayed at a position where the window is not interrupted by the cover.

According to the present embodiment, the screen control unit is caused to control a display position of a window that is not necessary to be secret. The flowchart illustrated in FIG. 8 shows an example of a process thereof.

In Act 11, when an object that comes into contact with the touch panel 14 is detected, the process proceeds to Act 12, and it is determined whether or not the object is the peep-blocking cover. When the object is not the peep-blocking cover, the process returns to Act 11, and when the object is the peep-blocking cover, the process proceeds to Act 13.

In Act 13, it is determined whether or not a window displayed on the display 13 is a window to input or output secret information. When the window is the window to input or output secret information, the process proceeds to Act 14. Otherwise, the process proceeds to Act 17.

In Act 14, it is determined whether or not a position and a size of a window to input or output secret information are in a range that is blocked by the peep-blocking cover. When the position and size are not in the range, the process proceeds to Act 15. When the position and size are in the range, the process proceeds to Act 16. A region in which a screen is actually blocked by the object is stored by a blocking range storage unit as the object covering range in association with the object contact pattern described according to the second embodiment.

In Act 15, the display position or size of the window to input or output the secret information is changed to be blocked by the peep-blocking cover, and the process proceeds to Act 16.

In Act 16, it is determined whether or not all the windows are checked. When all the windows are not checked, the process returns to Act 13. When all the windows are checked, the process ends.

Meanwhile, in Act 17, when the window is not the window to input or output the secret information, it is determined whether or not the position and size of the window are in a range that is blocked by the peep-blocking cover. When the position and size are in the range that is blocked, the process proceeds to Act 16. When the position and size are not in the range that is blocked, the process proceeds to Act 18.

In Act 18, the display position or size of the window are changed not to be blocked by the peep-blocking cover.

That is, according to the present embodiment, when the peep-blocking cover is detected to be mounted on the touch panel 14, the screen control unit 11 checks whether or not the windows are the windows to input or output secret information for all the windows that are displayed on the display 13, and then checks whether or not the windows are covered and blocked by the peep-blocking cover. When the window is the window to input or output secret information, the display position and size thereof are changed to be blocked by the peep-blocking cover. When the window is the window to input or output information that is not necessary to be secret, the display position and size thereof are changed not to be blocked by the peep-blocking cover. Since the screen control unit 11 acquires a mounting position of the peep-blocking cover on the display 13, the window to input or output information that is not necessary to be secret may be displayed in a region that is not overlapped with the mounting position of the peep-blocking cover, or the size thereof may be changed to be expanded or reduced to be outside the region of the mounting position of the peep-blocking cover.

In addition, when the screen control unit 11 determines that at least a part of the window to input or output information with a high level of secret is not fit in the cover 60 or 600, at least one of the display position and the display size of the window is caused to be changed such that the window is fit in the cover, or the window may not be displayed on the screen.

The embodiments described above are mere examples and the invention can be implemented in various another forms without departing from the spirits or gist of the invention. Therefore, the embodiments described above are by way of example only in all respects and the invention should not be limited to them. Interpretation of the technical matters indicated in the appended claims is not constrained by the text of the specification in any way. Further, all modifications, various improvements, alternations and reformulations belonging to equivalents of the appended claims are within the scope of the invention.

What is claimed is:

1. An information input and output apparatus comprising:
   a screen control unit that generates a screen which includes at least one region to input or output information as a window;
   a display attribute storage unit that stores a display and a non-display of each of the windows on the screen, and a position and a size of each of the windows when the windows are displayed on the screen, as a display attribute for each window;
   a display unit that displays the screen generated by the screen control unit;
   a contact position detecting unit that is disposed along a display surface of the display unit, and outputs a coordinate for each contact position to the screen control unit when contacts are simultaneously detected at a plurality of positions; and
   a blocking range storage unit that stores a range in which the screen is actually blocked in association with the identification information as a screen blocking range,
   wherein the screen control unit determines a region that is formed by connecting a plurality of contact positions, on the basis of coordinate information of the plurality of contact positions acquired by the contact position detecting unit, and changes the display attribute of the window in accordance with the region,
   wherein, when the screen control unit determines that pieces of detection information at the contact positions are pieces of pre-registered specific identification information of the contact positions, the screen control unit changes the display attribute of the window in accordance with the region, and
   wherein, when coordinates of contact positions detected by the contact position detecting unit matches the stored identification information, the screen control unit determines a screen corresponding to the stored screen blocking range in association with the identification information as a blocking range.

2. An information input and output apparatus comprising:
   a screen control unit that generates a screen which includes at least one region to input or output information as a window;
   a display attribute storage unit that stores a display and a non-display of each of the windows on the screen, and a position and a size of each of the windows when the windows are displayed on the screen, as a display attribute for each window;
   a display unit that displays the screen generated by the screen control unit; and
   a contact position detecting unit that is disposed along a display surface of the display unit, and outputs a coordinate for each contact position to the screen control unit when contacts are simultaneously detected at a plurality of positions,
   wherein the screen control unit determines a region that is formed by connecting a plurality of contact positions, on the basis of coordinate information of the plurality of contact positions acquired by the contact position detecting unit, and changes the display attribute of the window in accordance with the region,
   wherein the display attribute storage unit further stores a secret level of information that is input or output on the window for each window, and
   wherein, when the screen control unit determines that at least a part of a window to input or output information with a high level of secret is not fit within the region, at least one of a display position and a display size of the window is caused to be changed such that the window is fit within the region.

3. The apparatus according to claim 2,
   wherein, when the screen control unit determines that at least a part of a window to input or output information with a low level of secret is fit within the region, at least one of a display position and a display size of the window is caused to be changed such that the window is present outside the region.

4. An information input and output apparatus comprising:
   a screen control unit that generates a screen which includes at least one region to input or output information as a window;

a display attribute storage unit that stores a display and a non-display of each of the windows on the screen, and a position and a size of each of the windows when the windows are displayed on the screen, as a display attribute for each window;

a display unit that displays the screen generated by the screen control unit; and a contact position detecting unit that is disposed along a display surface of the display unit, and outputs a coordinate for each contact position to the screen control unit when contacts are simultaneously detected at a plurality of positions, wherein the screen control unit determines a region that is formed by connecting a plurality of contact positions, on the basis of coordinate information of the plurality of contact positions acquired by the contact position detecting unit, and changes the display attribute of the window in accordance with the region, wherein the region is set by causing a plurality of contact members disposed on a cover that includes a surrounded wall which is mounted on the contact position detecting unit to come into contact with the contact position detecting unit.

* * * * *